(12) United States Patent
Ahn et al.

(10) Patent No.: US 11,242,000 B1
(45) Date of Patent: Feb. 8, 2022

(54) WARNING MESSAGE DELIVERY APPARATUS OF VEHICLE

(71) Applicants: Hyundai Motor Company, Seoul (KR); Kia Motors Corporation, Seoul (KR)

(72) Inventors: Byoung Suk Ahn, Gwacheon-Si (KR); Seung Sik Han, Hwaseong-Si (KR); Sung Ho Park, Seoul (KR); Ki Hong Lee, Seoul (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/180,591

(22) Filed: Feb. 19, 2021

(30) Foreign Application Priority Data

Sep. 3, 2020 (KR) .......................... 10-2020-0112333

(51) Int. Cl.
 *B60Q 1/52* (2006.01)
 *G09F 13/16* (2006.01)
 *B60Q 7/02* (2006.01)

(52) U.S. Cl.
 CPC .............. *B60Q 1/525* (2013.01); *B60Q 7/02* (2013.01); *G09F 13/16* (2013.01)

(58) Field of Classification Search
 CPC ............ B60Q 1/525; B60Q 7/02; G09F 13/16

USPC .......................................................... 340/471
 See application file for complete search history.

(56) References Cited

U.S. PATENT DOCUMENTS

| 3,949,503 | A | * | 4/1976 | Waress | ................... | B60Q 7/005 |
|---|---|---|---|---|---|---|
| | | | | | | 40/591 |
| 4,054,789 | A | * | 10/1977 | Romanelli | ............... | B60Q 1/52 |
| | | | | | | 362/542 |
| 4,192,090 | A | * | 3/1980 | Seth | ......................... | B60Q 7/00 |
| | | | | | | 340/472 |
| 2005/0072350 | A1 | * | 4/2005 | Aasgaard | ................. | B60Q 1/52 |
| | | | | | | 116/259 |
| 2014/0300462 | A1 | * | 10/2014 | Russ | ........................ | B60Q 1/46 |
| | | | | | | 340/471 |

FOREIGN PATENT DOCUMENTS

| DE | 102015115242 A1 | 3/2017 |
|---|---|---|
| JP | 6436323 B2 | 12/2018 |
| WO | WO 2018/162221 A1 | 9/2018 |

* cited by examiner

*Primary Examiner* — Kerri L McNally
(74) *Attorney, Agent, or Firm* — Morgan, Lewis & Bockius LLP

(57) ABSTRACT

A warning message delivery apparatus of a vehicle, may deploy an emergency tripod by opening a trunk lid to deliver a warning message to a vehicle entering the rear upon the occurrence of an emergency situation, and secures visibility of the emergency tripod to reduce the accident occurrence possibility.

15 Claims, 9 Drawing Sheets

WARNING MESSAGE DELIVERY APPARATUS OF VEHICLE

CROSS REFERENCE TO RELATED APPLICATION

The present application claims priority to Korean Patent Application No. 10-2020-0112333 filed on Sep. 3, 2020, the entire contents of which is incorporated herein for all purposes by this reference.

BACKGROUND OF THE PRESENT INVENTION

Field of the Invention

The present invention relates to a warning message delivery apparatus of a vehicle having a tripod for delivering a safety warning message in an emergency situation installed simply and safely therein.

Description of Related Art

Various tools are required to flexibly cope with various situations in a vehicle. Particularly, an emergency tripod for making a driver in the rear vehicle recognize the situation upon failure or accident of a vehicle on the road is essentially required for the vehicle.

However, in the case of the emergency tripod, to warn the driver in the traveling rear vehicle, there is a hassle of having to move to the rear of the vehicle by about 150 to 200 m with the emergency tripod for installation. Therefore, there may occur a risk of the secondary accident in a process of installing the emergency tripod.

Furthermore, since a conventional emergency tripod warns the driver in the rear vehicle depending on the function of reflecting the light of the traveling rear vehicle, there is also the possibility of incurring the rear-end collision accident by the incomplete warning, and particularly, there is a problem in that the effectiveness of the reflector of the emergency tripod significantly deteriorates in rainy weather or at night.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a warning message delivery apparatus of a vehicle, which deploys an emergency tripod by opening a trunk lid upon occurrence of an emergency situation to deliver a warning message to a vehicle entering the rear, and secures the visibility of the emergency tripod to reduce the accident occurrence possibility.

A warning message delivery apparatus of a vehicle according to various exemplary embodiments of the present invention for achieving the object includes: a mounting portion configured to be fixed to an internal surface of a trunk lid; a guide portion rotatably mounted on the mounting portion, and rotated by a weight of the guide portion in a state where the trunk lid is opened and deployed the rear of the vehicle; and an end portion rotatably mounted on the guide portion and configured to be moved to the rear of a vehicle together when the guide portion is deployed, and deployed downward when the guide portion is completely opened and converted into a shape of delivering a warning message.

The guide portion is configured to be deployed with an inclination downwardly in the state where the trunk lid is opened.

The guide portion includes: a first guide bracket and a second guide bracket having one end portions provided on the mounting portion to be laterally rotated, and the other end portions connected to the end portion, and the first guide bracket and the second guide bracket are rotated in directions opposite to each other and deployed while being deployed toward the trunk lid or retracted to the rear of the vehicle.

A circular gear is formed on each of one end portions of the first guide bracket and the second guide bracket, and one end portions of the first guide bracket and the second guide bracket are gear-connected through the engagement of each circular gear.

The end portion includes: a joint portion including a first joint bracket rotatably connected to the other end portion of the first guide bracket, and a second joint bracket rotatably connected to the other end portion of the second guide bracket; and a plurality of link brackets rotatably connected to the first joint bracket and the second joint bracket and converted into the shape of delivering the warning message when the guide portion is completely deployed.

The first joint bracket has one end portion connected to the first guide bracket to be vertically rotated, the second joint bracket has one end portion connected to the second guide bracket to be vertically rotated, and the rotating center axes of the first joint bracket and the second joint bracket are linearly consistent with each other when the guide portion is completely deployed.

The link bracket includes a first connecting link having one end portion connected to the first joint bracket to be laterally rotatable, a second connecting link having one end portion connected to the second joint bracket to be laterally rotatable, and a third connecting link connected to the other end portion of the first connecting link and the other end portion of the second connecting link to be laterally rotatable.

The third connecting link has one end portion connected to the second connecting link and the other end portion connected to the first connecting link in a state where the first connecting link and the second connecting link are crossed such that when the guide portion is deployed, the first connecting link, the second connecting link, and the third connecting link form a triangular shape.

The link bracket includes: a bracket housing formed to communicate to the rear of the vehicle and extending in the longitudinal direction thereof; a light source portion provided inside the bracket housing to radiate light to the rear of the vehicle; and a lens portion mounted on the communicating end portion of the bracket housing and configured such that the light radiated by the light source portion is emitted to the outside.

The light source portion is disposed to be spaced in the longitudinal direction of the bracket housing.

The lens portion includes a transparent lens disposed to face the light source portion and configured such that the light source portion emits the light, and a reflector having an external surface having a red-series color and having an internal surface formed to absorb or reflect the light of the light source portion to prevent the light from being emitted to the outside.

The mounting portion includes: a fixing bracket configured to be fixed to the trunk lid and having an extending installation portion; and a rotating bracket having one end portion formed to surround the installation portion and provided on the fixing bracket to be rotated and tilted laterally, and the other end portion formed to accommodate the guide portion and provided such that the guide portion is laterally rotatable.

The fixing bracket is formed with a plurality of locking slits radially extending around the rotating center point of the rotating bracket, and the rotating bracket is formed with a plurality of locking projections matched with the plurality of locking slits as the locking slits radially extend around the rotating center point of the rotating bracket.

The warning message delivery apparatus of the vehicle formed of the aforementioned structure deploys the emergency tripod by opening the trunk lid upon occurrence of the emergency situation to deliver the warning message to the vehicle entering the rear, and secures the visibility of the emergency tripod to reduce the accident occurrence possibility.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
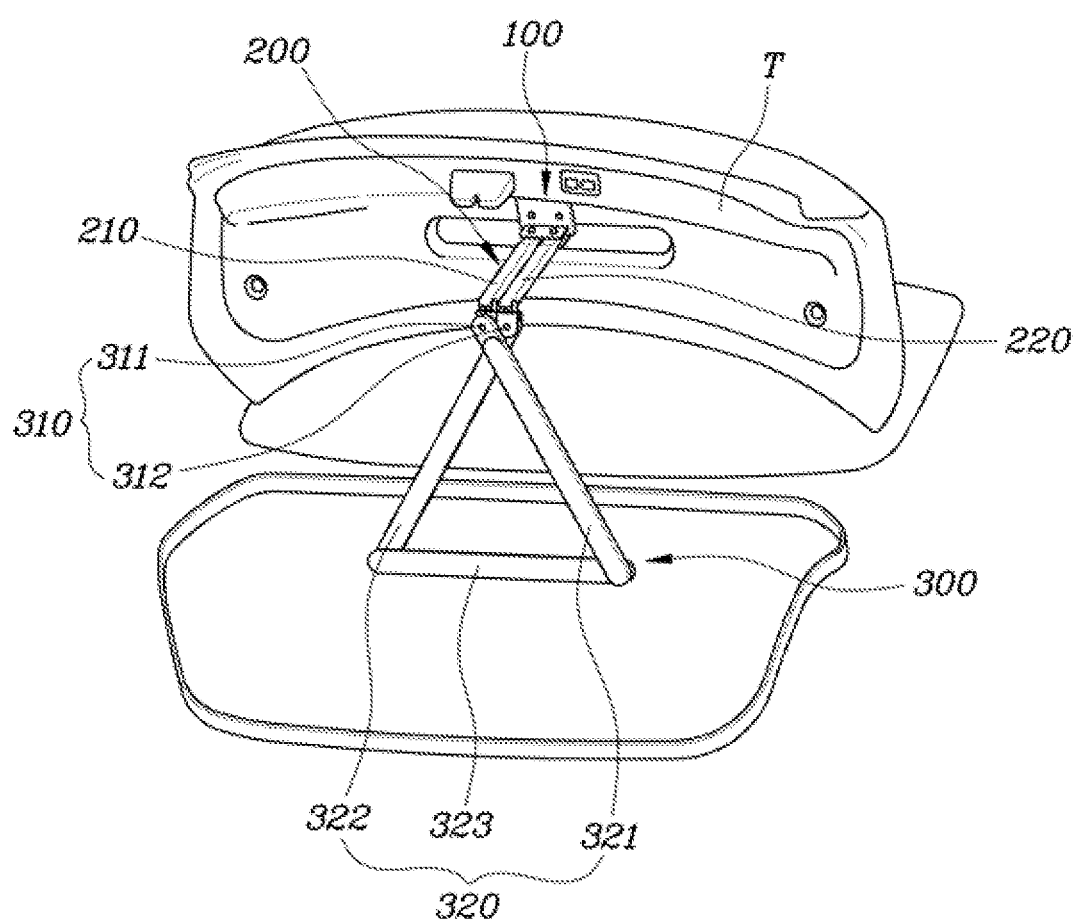
FIG. 1 is a diagram illustrating a warning message delivery apparatus of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a warning message delivery apparatus of a vehicle according to exemplary embodiments of the present invention will be described with reference to the accompanying drawings.

Figure 4:
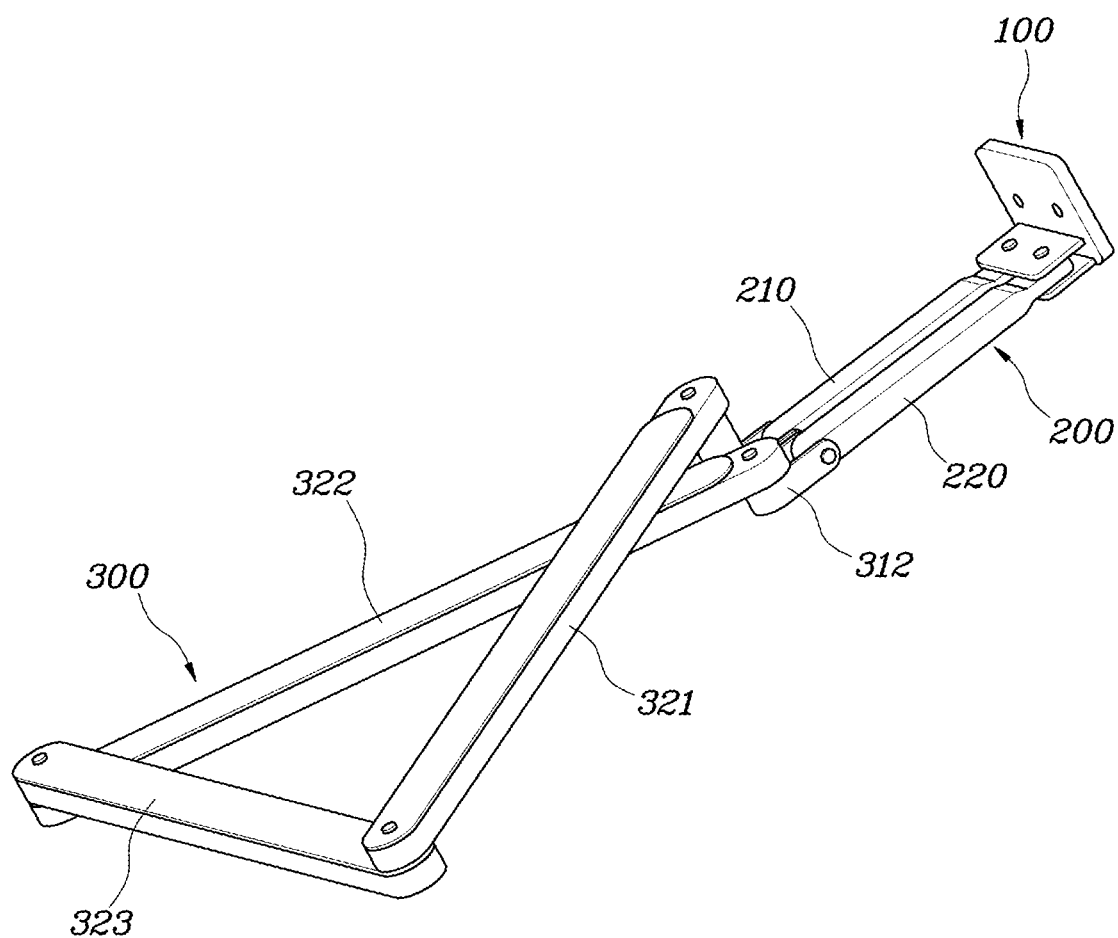
Figure 5:
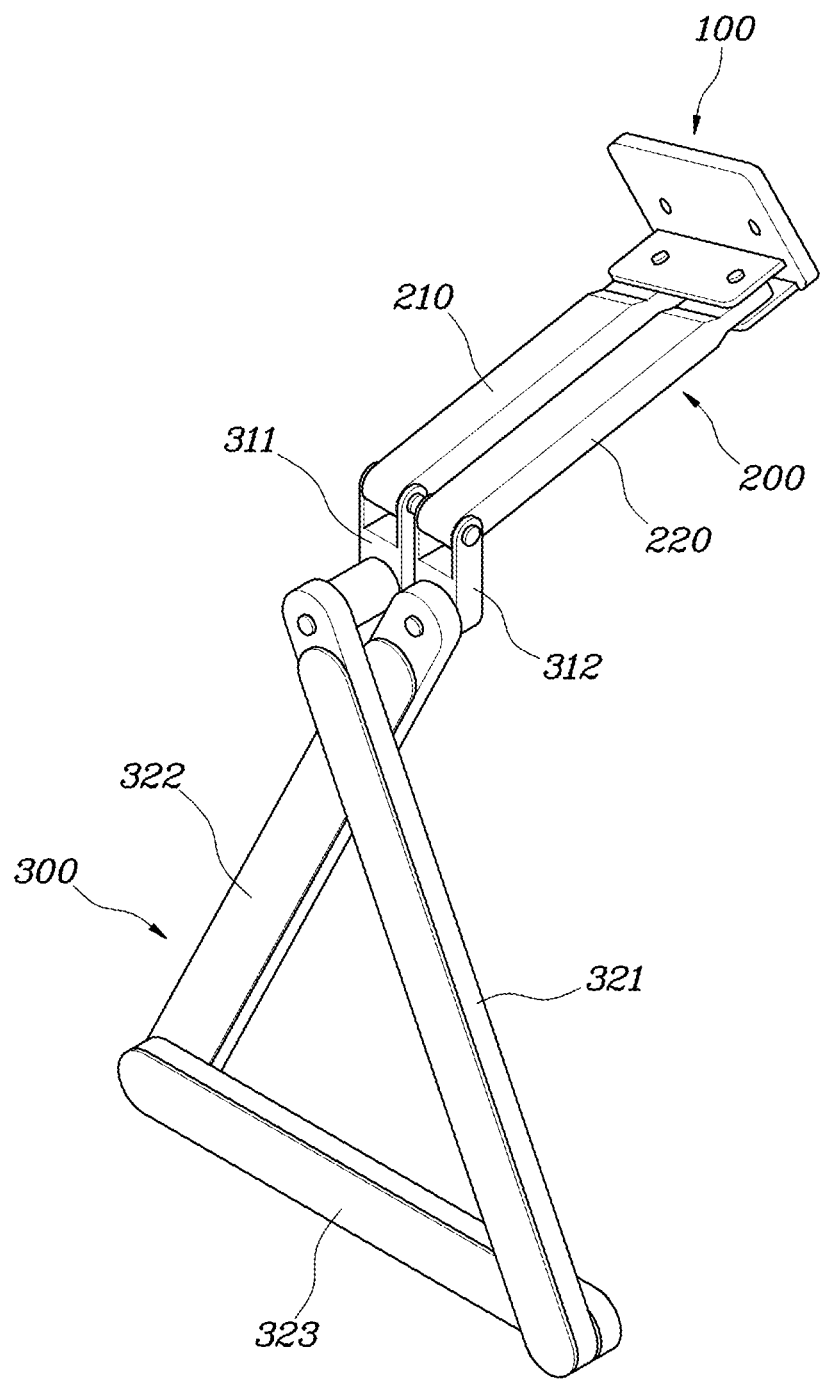
Figure 6:
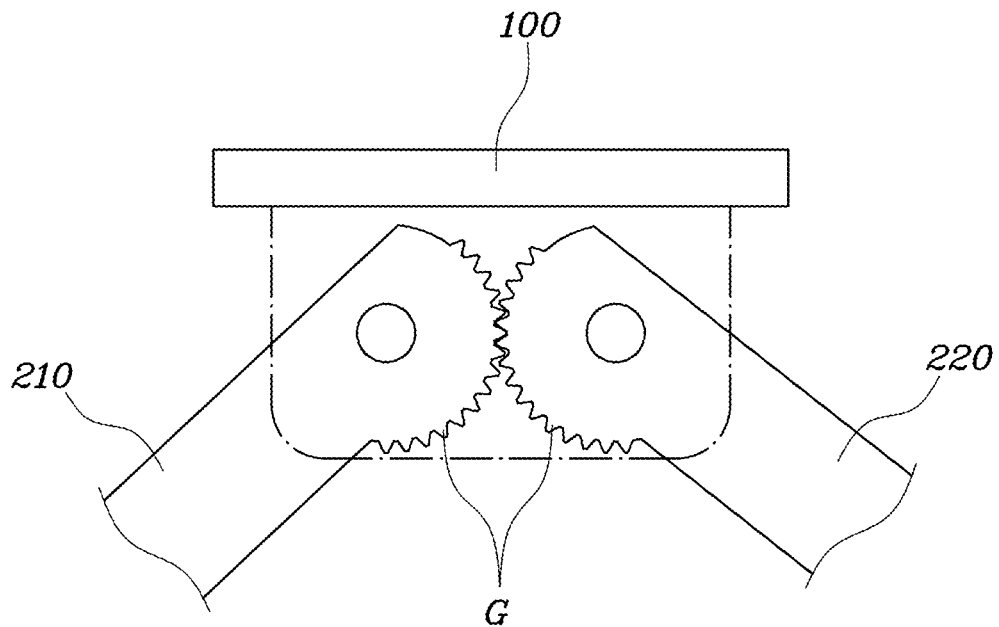
FIG. 6 is a diagram for explaining a guide portion of the warning message delivery apparatus of the vehicle illustrated in FIG. 1.
Figure 7:
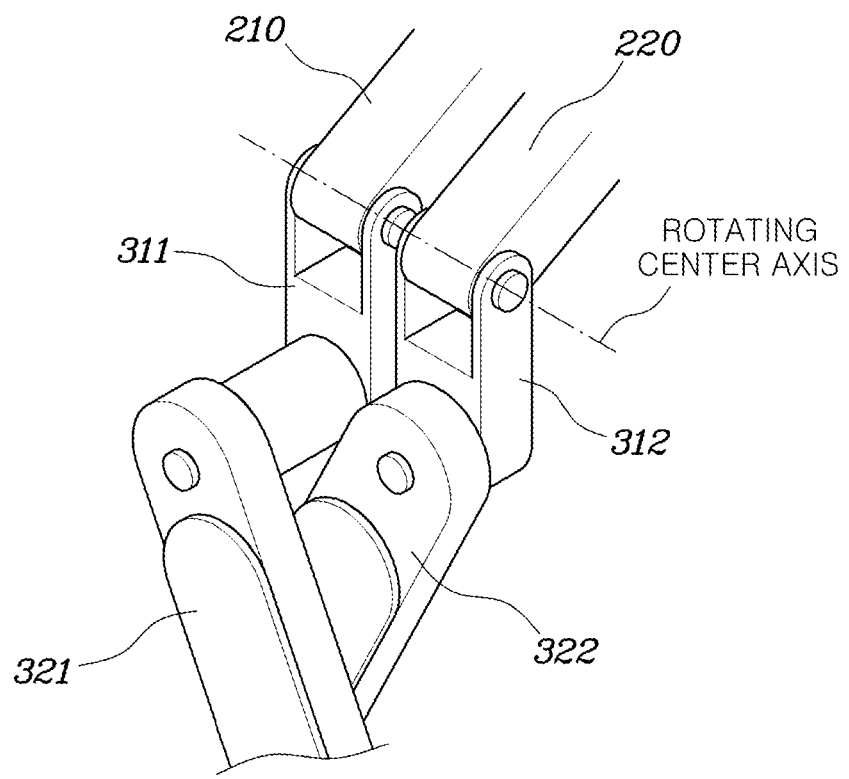
FIG. 7 is a diagram for explaining an end portion of the warning message delivery apparatus of the vehicle illustrated in FIG. 1.
Figure 8:
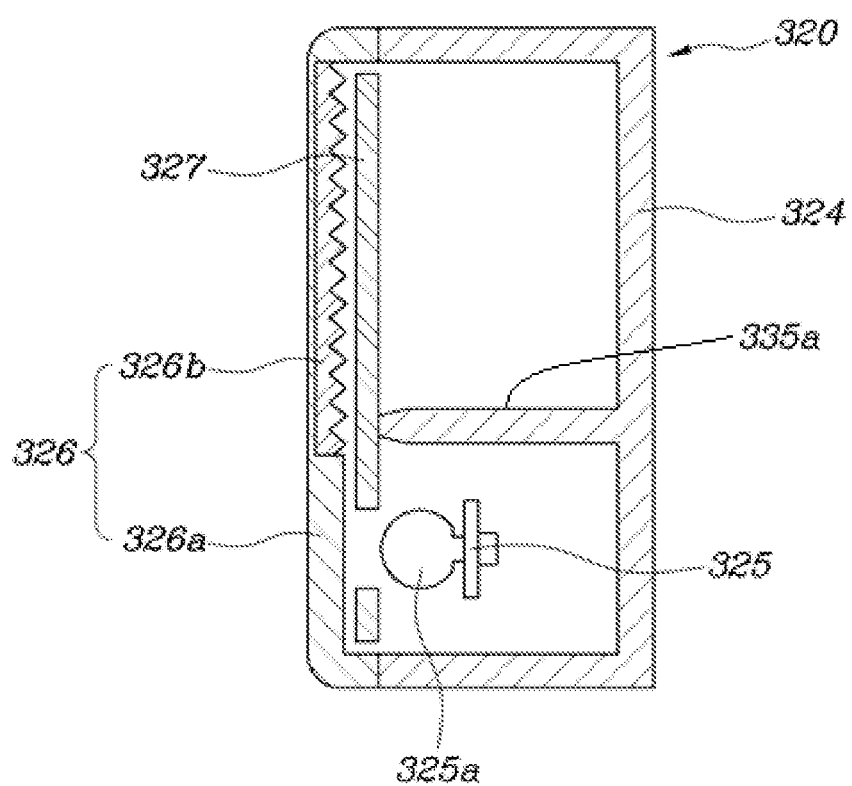
FIG. 8 is a diagram illustrating a light generating structure of the end portion according to an exemplary embodiment of the present invention.
Figure 9:
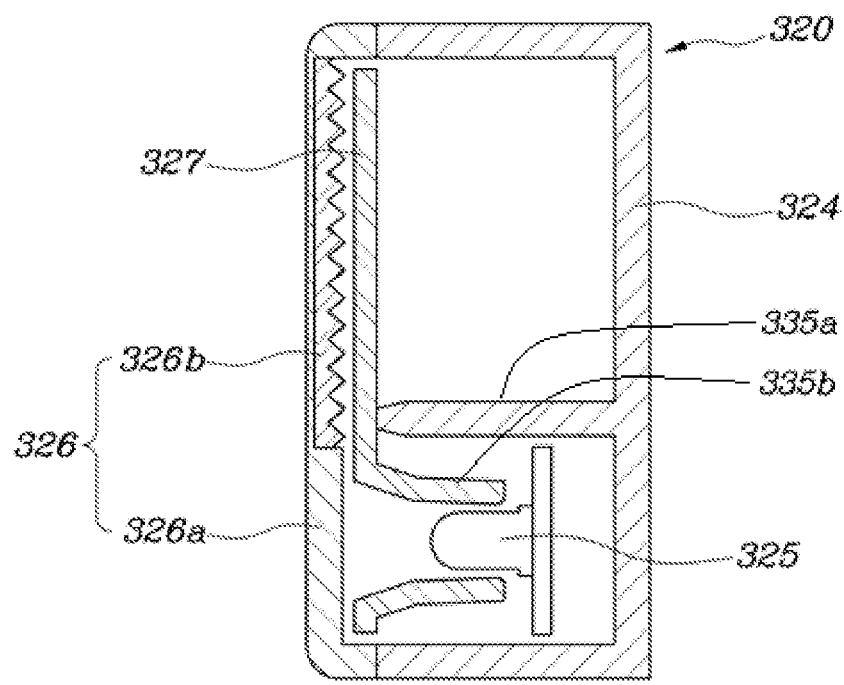
FIG. 9 is a diagram illustrating a light generating structure of the end portion according to another exemplary embodiment of the present invention.
Figure 10:
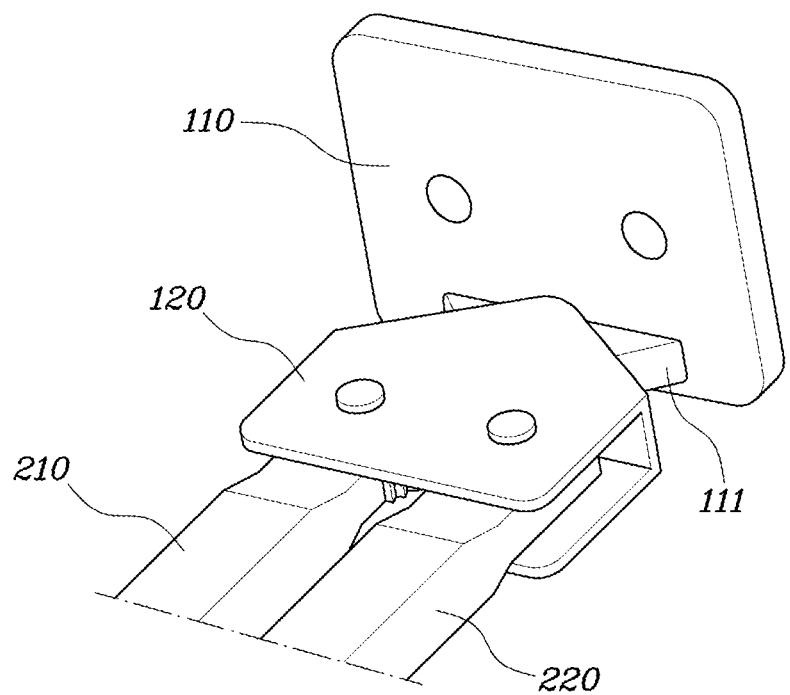
FIG. 10, and FIG. 11 are diagrams for explaining a mounting portion of the warning message delivery apparatus of the vehicle illustrated in FIG. 1.
Figure 11:
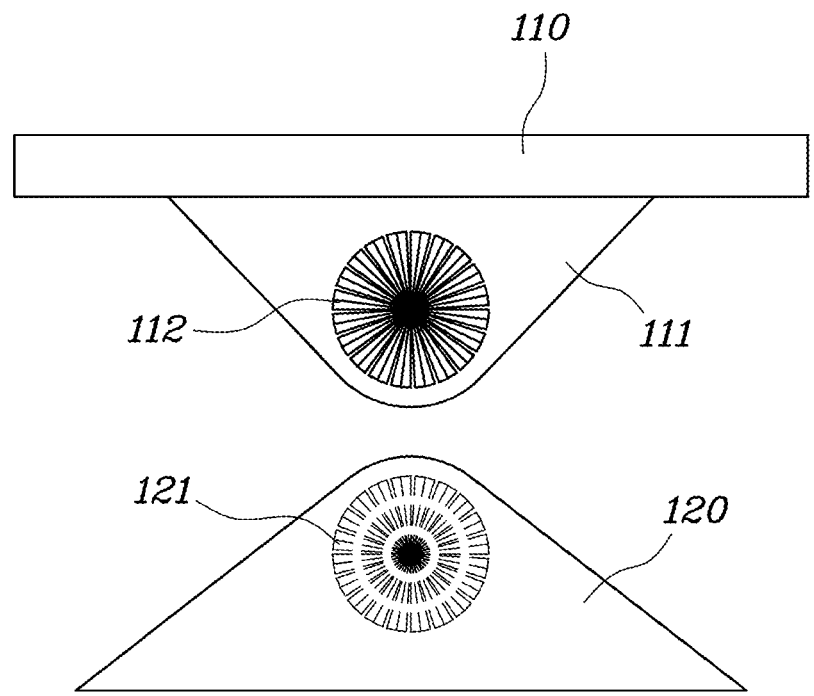
Figure 12:
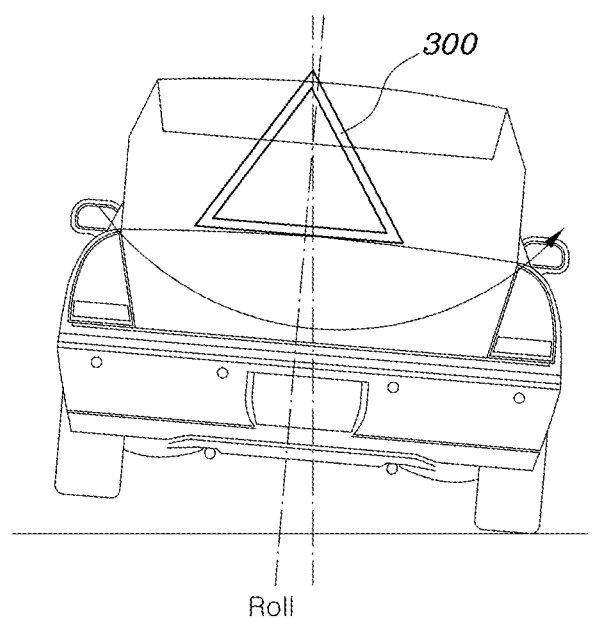
FIG. 12, and FIG. 13 are diagrams for explaining a deployment location adjustment of the end portion in an emergency situation.
Figure 13:
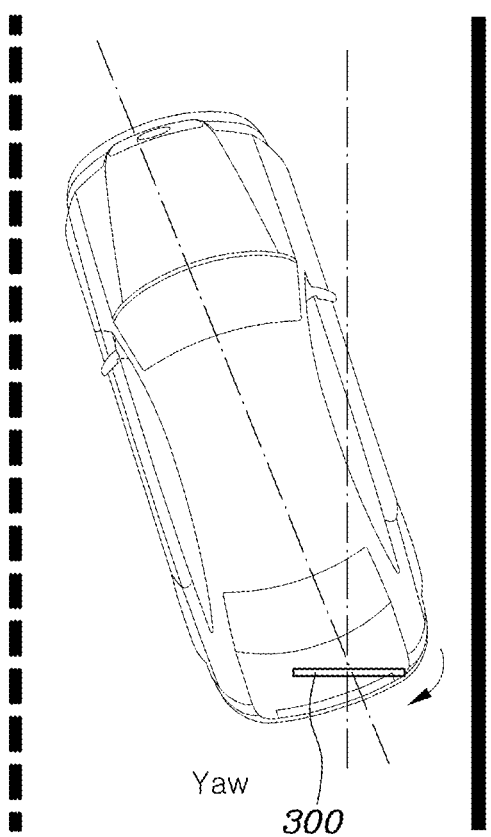

FIG. 1 is a diagram illustrating a warning message delivery apparatus of a vehicle according to various exemplary embodiments of the present invention, FIG. 2, FIG. 3, FIG. 4 and FIG. 5 are diagrams for explaining a deployment operation of the warning message delivery apparatus of the vehicle illustrated in FIG. 1, FIG. 6 is a diagram for explaining a guide portion of the warning message delivery apparatus of the vehicle illustrated in FIG. 1, FIG. 7 is a diagram for explaining an end portion of the warning message delivery apparatus of the vehicle illustrated in FIG. 1, FIG. 8 is a diagram illustrating a light generating structure of the end portion according to various exemplary embodiments of the present invention, FIG. 9 is a diagram illustrating a light generating structure of the end portion according to another exemplary embodiment of the present invention, FIG. 10, and FIG. 11 are diagrams for explaining a mounting portion of the warning message delivery apparatus of the vehicle illustrated in FIG. 1, and FIG. 12, and FIG. 13 are diagrams for explaining a deployment location adjustment of the end portion in an emergency situation.

As illustrated in FIG. 1, FIG. 2, FIG. 3, FIG. 4, and FIG. 5, a warning message delivery apparatus of a vehicle according to various exemplary embodiments of the present invention includes a mounting portion 100 fixed to the internal surface of a trunk lid T; a guide portion 200 provided on the mounting portion 100 to be rotatable, and rotated by a weight of the guide portion in a state where the trunk lid T is opened and deployed to the rear of the vehicle; and an end portion 300 provided on the guide portion 200 and moved to the rear of the vehicle together upon deployment of the guide portion 200, and deployed downward when the guide portion 200 is completely deployed and converted into a shape of delivering a warning message.

As described above, the present invention includes the mounting portion 100, the guide portion 200, and the end portion 300, in which the guide portion 200 and the end portion 300 are deployed and moved to the rear of the vehicle together from the mounting portion 100 fixed to the trunk lid T, and the end portion 300 is converted into the shape of delivering the warning message.

That is, the mounting portion 100 may be fixed to the internal surface of the trunk lid T, and the guide portion 200 may be rotated in the lateral direction of the vehicle from the mounting portion 100 to be stored in the trunk lid T side or deployed to the rear of the vehicle. Here, the guide portion 200 is rotated by its own weight when the trunk lid T is opened and deployed to the rear of the vehicle such that the user may easily deploy the guide portion 200. The location of the guide portion 200 may be fixed through a constraint means such as a strap, and the constraint of the strap is released depending on whether it is used such that the guide portion 200 and the end portion 300 may be deployed by their own weights.

The end portion 300 is provided on the guide portion 200, the location thereof is changed by the deployment operation of the guide portion 200, and the end portion 300 is converted into the shape of delivering the warning message while being deployed downward when the guide portion 200 is completely deployed. The end portion 300 may be converted into a polygonal shape or a circular shape to deliver the warning message to the vehicle driver entering the rear, and coated in color to secure visibility.

As described above, according to various exemplary embodiments of the present invention, when the trunk lid T is opened, the guide portion 200 is deployed to the rear of the vehicle, and the end portion 300 moved to the rear of the vehicle by the guide portion 200 is converted into the shape recognizable by the driver in the rear vehicle and transferring the warning message. The deployment operation of the guide portion 200 is completed and then the deployed operation of the end portion 300 is performed such that the guide portion 200 is not interfered with a trunk compartment and peripheral components when being moved to the rear of the vehicle, and the movement is completed and then the end portion 300 may be unfolded, avoiding the interference with other components and stably implementing the shape for delivering the warning message.

Specifically describing the aforementioned present invention, the guide portion 200 may be configured to be deployed with an inclination downwardly in a state where the trunk lid T is opened.

As illustrated in FIG. 1, as the guide portion 200 is provided to have the inclination downwardly in the state where the trunk lid T is opened, the guide portion 200 may be rotated and deployed downward by its own weight when the trunk lid T is opened. That is, the guide portion 200 may be rotated downward when the trunk lid T is opened as the weight of the end portion 300 is added together with its own weight. In the state where the trunk lid T is opened, if the guide portion 200 is to be configured to be linearly deployed to the rear of the vehicle, the deployment may not be smoothly performed by its own weight, and if the guide portion 200 is to be configured to be vertically deployed downward, the end portion 300 interferes with the trunk and the guide portion 200 is not unfolded. Therefore, the guide portion 200 is configured to be deployed with the inclination in the state where the trunk lid T is opened.

Meanwhile, the guide portion 200 includes a first guide bracket 210 and a second guide bracket 220 having one end portions provided on the mounting portion 100 to be rotated laterally and the other end portions connected to the end portion 300, and the first guide bracket 210 and the second guide bracket 220 may be rotated in the opposite directions and deployed while being deployed toward the trunk lid T or retracted to the rear of the vehicle.

Figure 2:
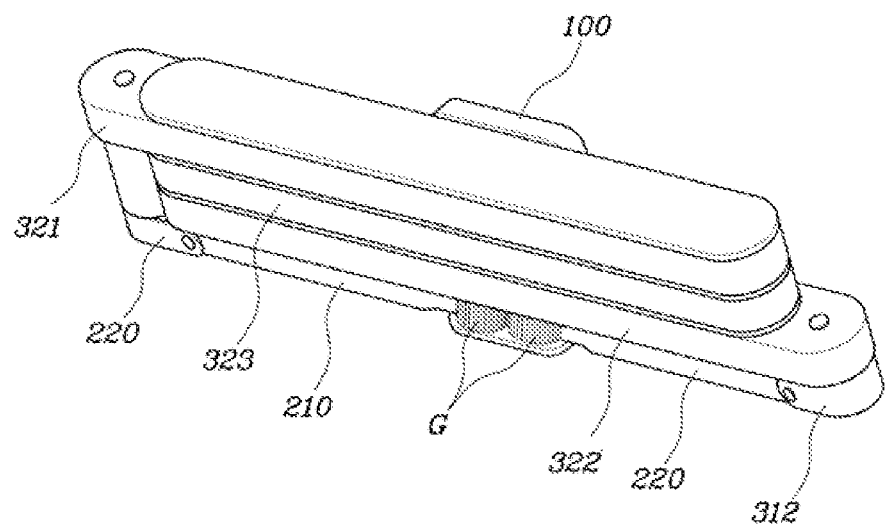
FIG. 2, FIG. 3, FIG. 4 and FIG. 5 are diagrams for explaining a deployment operation of the warning message delivery apparatus of the vehicle illustrated in FIG. 1.

As illustrated in FIG. 2, FIG. 3, FIG. 4 and FIG. 5, the guide portion 200 includes the first guide bracket 210 and the second guide bracket 220, and the first guide bracket 210 and the second guide bracket 220 are provided on the mounting portion 100 to be rotated and configured to be rotated in the opposite directions. Therefore, as illustrated in FIG. 2, the first guide bracket 210 and the second guide bracket 220 are rotated and deployed toward the trunk lid T on the mounting portion 100 to become the storage state.

Figure 3:
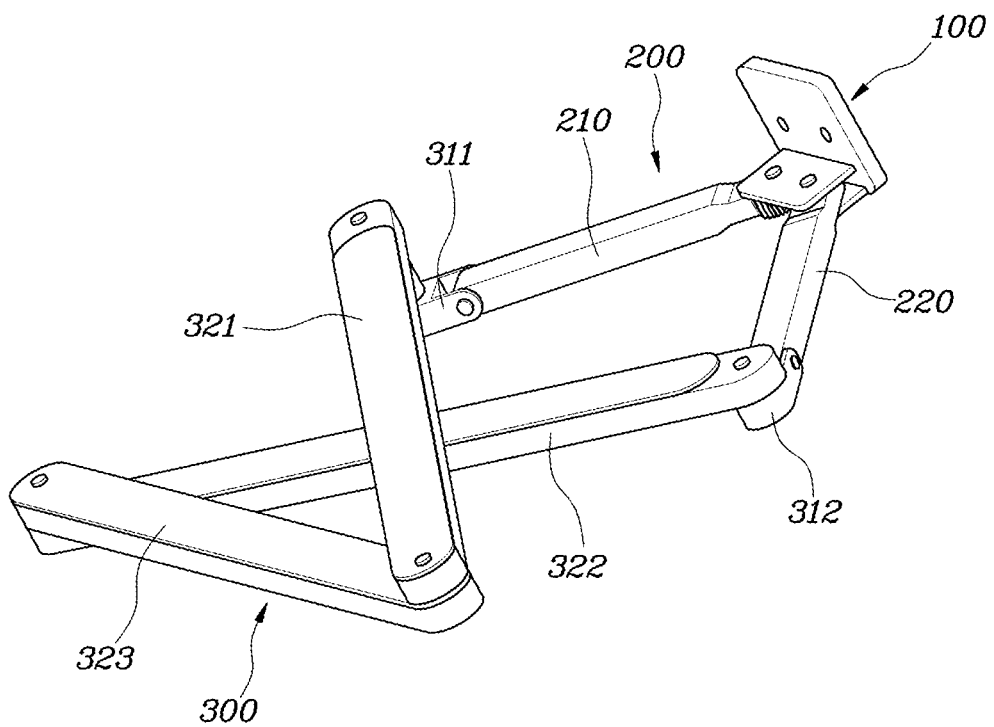

Here, as illustrated in FIG. 3, FIG. 4, and FIG. 5, the first guide bracket 210 and the second guide bracket 220 are rotated and retracted to the rear of the vehicle to become the deployment state, and the end portion 300 connected to the first guide bracket 210 and the second guide bracket 220 is moved to the rear side of the vehicle.

To rotate the first guide bracket 210 and the second guide bracket 220 in the opposite directions, a circular gear G is formed on each of one end portions of the first guide bracket 210 and the second guide bracket 220, and one end portions of the first guide bracket 210 and the second guide bracket 220 may be gear-connected through the engagement of each circular gear G.

As illustrated in FIG. 6, as the first guide bracket 210 and the second guide bracket 220 are gear-connected through the circular gear G formed on each of one end portions thereof, the second guide bracket 220 is rotated counterclockwise when the first guide bracket 210 is rotated clockwise, and the second guide bracket 220 is rotated clockwise when the first guide bracket 210 is rotated counterclockwise. Therefore, the first guide bracket 210 and the second guide bracket 220 have the respective one end portions connected through the circular gear G and the other end portions rotated and moved, performing the deployed or retracted operation.

As described above, as the first guide bracket 210 and the second guide bracket 220 are rotated in the opposite directions, the first guide bracket 210 and the second guide bracket 220 are converted into the storage state or the deployment state. Furthermore, the radiuses according to the rotating operations of the first guide bracket 210 and the second guide bracket 220 are reduced, reducing the installation space.

Meanwhile, the end portion 300 may include a joint portion 310 including a first joint bracket 311 rotatably connected to the other end portion of the first guide bracket 210, and a second joint bracket 312 rotatably connected to the other end portion of the second guide bracket 220; and a plurality of link brackets 320 rotatably connected to the first joint bracket 311 and the second joint bracket 312 and converted into a shape of delivering the warning message when the guide portion 200 is completely deployed.

As described above, the end portion 300 includes the joint portion 310 and the link bracket 320, in which when the guide portion 200 is completely deployed, the joint portion 310 is rotated from the guide portion 200 to move the link bracket 320 to be easily recognizable by the driver in the rear vehicle, and the link bracket 320 is converted into the shape of delivering the warning message such that the driver in the rear vehicle may confirm the warning message.

That is, the joint portion 310 includes a first joint bracket 311 connected to the first guide bracket 210 and a second joint bracket 312 connected to the second guide bracket 220, and when the locations of the plurality of link brackets 320 connected to the first joint bracket 311 and the second joint bracket 312 are moved by the first joint bracket 311 and the second joint bracket 312, the respective link brackets 320 are rotated and converted into the shape of delivering the warning message.

Specifically describing the above content, as illustrated in FIGS. 5 and 7, the first joint bracket 311 has one end portion connected to the first guide bracket 210 to be vertically rotatable; the second joint bracket 312 has one end portion connected to the second guide bracket 220 to be vertically rotatable; and the rotating center axes of the first joint bracket 311 and the second joint bracket 312 are linearly consistent with each other when the guide portion 200 is completely deployed.

Furthermore, the link bracket 320 includes a first connecting link 321 having one end portion connected to the first joint bracket 311 to be laterally rotatable, a second connecting link 322 having one end portion connected to the second joint bracket 312 to be laterally rotatable, and a third connecting link 323 connected to the other end portion of the first connecting link 321 and the other end portion of the second connecting link 322 to be laterally rotatable.

As described above, the first joint bracket 311 is hinged to the other end portion of the first guide bracket 210 to be vertically rotated, and the second joint bracket 312 is hinged to the other end portion of the second guide bracket 220 to be vertically rotated. As the first guide bracket 210 and the second guide bracket 220 have the respective one end portions connected to each other and the other end portions rotated to be retracted or unfolded, the first joint bracket 311 and the second joint bracket 312 are rotated and moved together.

Here, the link bracket 320 includes a first connecting link 321, a second connecting link 322, and a third connecting link 323 rotatably connected to each other, and the first connecting link 321, the second connecting link 322, and the third connecting link 323 are simultaneously rotated. As the first connecting link 321 is connected to the first joint bracket 311 and the second connecting link 322 is connected to the second joint bracket 312, if the rotating center axes of the first joint bracket 311 and the second joint bracket 312 are not consistent with each other by the connection between the first connecting link 321 and the second connecting link 322, the vertical rotations of the first joint bracket 311 and the second joint bracket 312 are constrained, and if the rotating center axes of the first joint bracket 311 and the second joint bracket 312 are consistent with each other, the vertical rotations of the first joint bracket 311 and the second joint bracket 312 are allowed. That is, as illustrated in FIG. 2, FIG. 3 and FIG. 4, as the first joint bracket 311 and the second joint bracket 312 rotated and moved with the rotations of the first guide bracket 210 and the second guide bracket 220 are connected to the first connecting link 321 and the second connecting link 322, respectively, if the rotating center axes of the first joint bracket 311 and the second joint bracket 312 are not consistent with each other, the rotations thereof are limited to the vertical direction thereof. At the instant time, the connecting form of the first connecting link 321, the second connecting link 322, and the third connecting link 323 is changed while the first connecting link 321 and the second connecting link 322 are deployed by the retracting operations of the first guide bracket 210 and the second guide bracket 220. Accordingly, as illustrated in FIGS. 5 and 7, when the first guide bracket 210 and the second guide bracket 220 are completely rotated to be retracted, the rotating center axes of the first joint bracket 311 and the second joint bracket 312 are linearly consistent with each other such that the first joint bracket 311 and the second joint bracket 312 becomes a state of being vertically rotatable. Therefore, the plurality of link brackets 320 are rotated downward by their own weights via the first joint bracket 311 and the second joint bracket 312 to be vertically mounted, as illustrated in FIG. 5.

As described above, according to various exemplary embodiments of the present invention, when the guide portion 200 is deployed, the joint portion 310 and the plurality of link brackets 320 configuring the end portion 300 are moved to the rear of the vehicle together with the guide portion 200 and the plurality of link brackets 320 are converted into the shape of delivering the warning message, and when the guide portion 200 is completely deployed, as the vertical rotation of the joint portion 310 is allowed, the plurality of link brackets 320 are vertically mounted downward. Therefore, in the state where the trunk lid T is opened, the guide portion 200 avoids the interference with other components when the end portion 300 is moved to the rear of the vehicle, and as the end portion 300 is completely move to the rear of the vehicle and then vertically disposed, the driver in the rear vehicle easily recognizes the warning message according to the shape of the end portion 300.

Here, the third connecting link 323 has one end portion connected to the second connecting link 322 and the other end portion connected to the first connecting link 321 in a state where the first connecting link 321 and the second connecting link 322 are crossed such that when the guide portion 200 is deployed, the first connecting link 321, the second connecting link 322, and the third connecting link 323 may form a triangular shape. As described above, when the guide portion 200 is completely deployed, the first connecting link 321, the second connecting link 322, and the third connecting link 323 may be deployed in the triangular shape to deliver the warning message such as the emergency tripod. Considering the implementation and storage of the triangular shape, the lengths of the first connecting link 321, the second connecting link 322, and the third connecting link 323 may be equally formed. Furthermore, the link bracket 320 may change the message to be delivered by further adding the connecting link in addition to the first connecting link 321, the second connecting link 322, and the third connecting link 323 or changing the shape of each connecting link.

Meanwhile, as illustrated in FIG. 8, the link bracket 320 includes a bracket housing 324 formed to communicate to the rear and extending in the longitudinal direction thereof; a light source portion 325 provided inside the bracket housing 324 to radiate light to the rear; and a lens portion 326 mounted on the communicating end portion of the bracket housing 324 and configured such that the light radiated by the light source portion 325 is emitted to the outside. Furthermore, a bezel portion 327 may be further provided between the bracket housing 324 and the lens portion 326 for a lighting image and an appearance image.

As described above, each connecting link configuring the link bracket 320 may be configured to radiate light. The link bracket 320 includes the bracket housing 324, the light source portion 325, and the lens portion 326, in which the bracket housing 324 is formed to communicate to the rear, and the light source portion 325 is provided to radiate the light to the rear inside the bracket housing 324. Furthermore, the open end portion of the bracket housing 324 is mounted with the lens portion 326 and the open end portion is closed. Here, the light source portion 325 may be an LED. Therefore, as the light radiated by the light source portion 325 is emitted to the outside through the lens portion 326 in the link bracket 320, it is easy to recognize the warning message through the link bracket 320 in rainy weather or at night.

As described above, the link bracket 320 is configured such that the light is radiated, and the light source portion 325 may radiate the light in various forms according to an exemplary embodiment of the present invention. As the exemplary embodiment of the present invention, as illustrated in FIG. 8, the light source portion 325 may further include a light guide 335*a* extending in the longitudinal direction of the bracket housing 324. That is, as the light radiated by the LED is emitted through the light guide, the light source portion 325 is configured in the form in which the light is emitted in the longitudinal direction of the link bracket 320.

As an exemplary embodiment of the present invention, a light guide 335b is further installed in the bracket housing 324 and connected to an end of the bezel portion 327, wherein the light source portion 325 is mounted in the light guide 335b.

As illustrated in FIG. 9, the light source portion 325 is disposed to be spaced in the longitudinal direction of the bracket housing 324 and thus may be configured such that the light is radiated in a dot type in the longitudinal direction of the link bracket 320. This may be determined depending on the type of light radiation, and changed depending on the number of LEDs configuring the light source portion 325 and whether the light guide 335b is used.

Meanwhile, the lens portion 326 may include a transparent lens 326a disposed to face the light source portion 325 and configured such that the light source portion 325 emits the light, and a reflector 326b having the external surface having a red-series color and the internal surface formed to absorb or reflect the light of the light source portion 325 to prevent the light from being emitted to the outside. Here, the transparent lens 326a and the reflector 326b extend in the longitudinal direction thereof, and as the external surface of the reflector 326b has the red-series color, the reflector 326b may be always identified. Furthermore, as the internal surface of the reflector 326b is configured to absorb or reflect the light, the light radiated by the light source portion 325 is not emitted to the outside from the reflector 326b. To the present end, a plurality of optics may be formed on the internal surface of the reflector 326b, and made of a material having a low light transmittance. Therefore, if the light source portion 325 is operated to radiate the light, as the light is emitted from only the transparent lens 326a, the image according to the form of the link bracket 320 may be smoothly implemented.

Meanwhile, as illustrated in FIG. 10, and FIG. 11, the mounting portion 100 includes a fixing bracket 110 fixed to the trunk lid T and having an extending installation portion 111; and a rotating bracket 120 having one end portion formed to surround the installation portion 111 and configured to be rotated and tilted laterally from the fixing bracket 110, and the other end portion formed to accommodate the guide portion 200 and provided such that the guide portion 200 is laterally rotatable.

Here, the fixing bracket 110 is fixed to the internal surface of the trunk lid T, and the rotating bracket 120 is rotated and tilted laterally from the fixing bracket 110 such that the guide portion 200 and the end portion 300 connected thereto are in place by their own weights. That is, upon the occurrence of the emergency situation of the vehicle, the vehicle may be stopped in a state of being tilted in the roll direction or the yaw direction thereof. At the instant time, when the rotating bracket 120 is laterally rotated from the fixing bracket 110, a clearance for the roll direction may be absorbed, and when the rotating bracket 120 is laterally tilted thereon, a clearance for the yaw direction may be adjusted.

The fixing bracket 110 may be formed with a plurality of locking slits 112 radially extending around the rotating center point of the rotating bracket 120, and the rotating bracket 120 may be formed with a plurality of locking projections 121 matched with the plurality of locking slits 112 as the plurality of locking projections 121 radially extend around the rotating center point of the rotating bracket 120.

Therefore, the rotating bracket 120 is connected to the fixing bracket 110 through the connection between the locking slit 112 and the locking projection 121. Here, the rotating bracket 120 may be laterally rotated from the fixing bracket 110 through the operation by which the locking projection 121 goes over the locking slit 112. Therefore, as illustrated in FIG. 12, the locations of the guide portion 200 and the end portion 300 may be laterally changed to adjust the location of the warning message through the end portion 300 in the roll direction of the vehicle.

Furthermore, the rotating bracket 120 may be laterally tilted from the fixing bracket 110 through the operation by which the locking projection 121 is tilted in the extending direction of the locking slit 112. Therefore, as illustrated in FIG. 13, the guide portion 200 and the end portion 300 are laterally tilted, and the location of the warning message through the end portion 300 may be adjusted in the yaw direction of the vehicle.

The aforementioned present invention may be operated as below.

Initially, as illustrated in FIG. 2, the state where the first guide bracket 210 and the second guide bracket 220 are deployed is maintained, and the link bracket 320 connected to each of the first joint bracket 311 and the second joint bracket 312 also becomes a state of being folded.

Here, when the trunk lid T is opened, the guide portion 200 and the end portion 300 perform the deployment operation by their own weights. That is, as illustrated in FIG. 3, as the first guide bracket 210 and the second guide bracket 220 are retracted, and the deployment operation is performed while the first connecting link 321, the second connecting link 322, and the third connecting link 323 configuring the link bracket 320 are unfolded. At the instant time, as the rotating center axes of the first joint bracket 311 and the second joint bracket 312 are not consistent with each other, the link bracket 320 is deployed in the same direction as the guide portion 200 by the first joint bracket 311 and the second joint bracket 312.

Therefore, as illustrated in FIG. 4, the guide portion 200 and the end portion 300 are linearly deployed toward the rear of the vehicle, and when the rotating center axes of the first joint bracket 311 and the second joint bracket 312 are consistent with each other, as illustrated in FIG. 5, the link bracket 320 is rotated downward via the first joint bracket 311 and the second joint bracket 312.

Therefore, the driver in the rear vehicle may recognize the warning message by the shape of the emergency tripod as the first connecting link 321, the second connecting link 322, and the third connecting link 323 configuring the link bracket 320 are unfolded.

The warning message delivery apparatus of the vehicle configured as the aforementioned structure deploys the emergency tripod by opening the trunk lid T to deliver the warning message to the vehicle entering the rear upon the occurrence of the emergency situation, and secures the visibility of the emergency tripod to reduce the accident occurrence possibility.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A warning message delivery apparatus of a vehicle, the warning message delivery apparatus comprising:
a mounting portion configured to be fixed to an internal surface of a trunk lid;
a guide portion rotatably mounted on the mounting portion, and rotated by a weight of the guide portion in a state where the trunk lid is opened and deployed to a predetermined direction; and
an end portion rotatably mounted on the guide portion and configured to be moved to the predetermined direction of the vehicle with the guide portion when the guide portion is deployed, and deployed downward when the guide portion is opened and converted into a shape of delivering a warning message.

2. The warning message delivery apparatus of the vehicle according to claim 1,
wherein the guide portion is configured to be deployed with an inclination downwardly in a state where the trunk lid is opened.

3. The warning message delivery apparatus of the vehicle according to claim 1,
wherein the guide portion includes a first guide bracket and a second guide bracket having first end portions pivotally mounted on the mounting portion to be laterally rotated, and second end portions pivotally connected to the end portion, and
wherein the first guide bracket and the second guide bracket are rotated in directions opposite to each other and deployed while being deployed toward the trunk lid or retracted to the predetermined direction of the vehicle.

4. The warning message delivery apparatus of the vehicle according to claim 3,
wherein a first gear is formed on the first end portion of the first guide bracket, and a second gear is formed on the first end portion of the second guide bracket, and
wherein the first gear and the second gear are gear-engaged to each other.

5. The warning message delivery apparatus of the vehicle according to claim 3,
wherein the end portion includes:
a joint portion including a first joint bracket rotatably connected to the second end portion of the first guide bracket, and a second joint bracket rotatably connected to the second end portion of the second guide bracket; and
a plurality of link brackets rotatably connected to the first joint bracket and the second joint bracket and converted into the shape of delivering the warning message when the guide portion is deployed.

6. The warning message delivery apparatus of the vehicle according to claim 5,
wherein the first joint bracket has a first end portion connected to the first guide bracket to be vertically rotated, the second joint bracket has a first end portion connected to the second guide bracket to be vertically rotated, and rotating center axes of the first joint bracket and the second joint bracket are linearly consistent with each other when the guide portion is deployed.

7. The warning message delivery apparatus of the vehicle according to claim 5,
wherein each of the plurality of link brackets includes a first connecting link having a first end portion connected to the first joint bracket to be laterally rotatable, a second connecting link having a first end portion connected to the second joint bracket to be laterally rotatable, and a third connecting link connected to a second end portion of the first connecting link and a second end portion of the second connecting link to be laterally rotatable.

8. The warning message delivery apparatus of the vehicle according to claim 7,
wherein the third connecting link has a first end portion connected to the second connecting link and a second end portion connected to the first connecting link in a state where the first connecting link and the second connecting link are crossed so that when the guide portion is deployed, the first connecting link, the second connecting link, and the third connecting link form a triangular shape.

9. The warning message delivery apparatus of the vehicle according to claim 5,
wherein the plurality of link brackets includes:
a bracket housing formed to communicate to the predetermined direction and extending in a longitudinal direction of the bracket housing;
a light source portion provided inside the bracket housing to radiate light to the rear; and
a lens portion mounted on a communicating end portion of the bracket housing and configured so that the light radiated by the light source portion is emitted to an outside of the bracket housing.

10. The warning message delivery apparatus of the vehicle according to claim 9,
wherein the light source portion is disposed to be spaced in the longitudinal direction of the bracket housing.

11. The warning message delivery apparatus of the vehicle according to claim 9,
wherein the lens portion includes a transparent lens disposed to face the light source portion and configured so that the light source portion emits the light, and a reflector having an external surface having a red-series color and having an internal surface formed to absorb or reflect the light of the light source portion to prevent the light from being emitted to the outside.

12. The warning message delivery apparatus of claim 9, further including:
a bezel portion provided between the bracket housing and the lens portion for a lighting image and an appearance image,
wherein a first light guide extending in a longitudinal direction of the bracket housing is provided onto the bezel portion in the bracket housing to guide the light of the light source portion between the reflector and the bezel portion.

13. The warning message delivery apparatus of claim 12, further including a second light guide into which the light source portion is placed, wherein the second light guide is connected to an end of the bezel portion.

14. The warning message delivery apparatus of the vehicle according to claim 1,
wherein the mounting portion includes:

a fixing bracket configured to be fixed to the trunk lid and having an extending installation portion; and a rotating bracket having a first one end portion formed to surround the installation portion and configured to be rotated and tilted laterally from the fixing bracket, and a second end portion formed to accommodate the guide portion and provided so that the guide portion is laterally rotatable.

15. The warning message delivery apparatus of the vehicle according to claim 14, wherein the fixing bracket is formed with a plurality of locking slits radially extending around a rotating center point of the rotating bracket, and wherein the rotating bracket is formed with a plurality of locking projections matched with the plurality of locking slits as the plurality of locking projections radially extends around the rotating center point of the rotating bracket.

\* \* \* \* \*